June 2, 1931. W. R. LAIRD 1,807,742
PASTEURIZING APPARATUS
Filed March 1, 1930 2 Sheets-Sheet 1
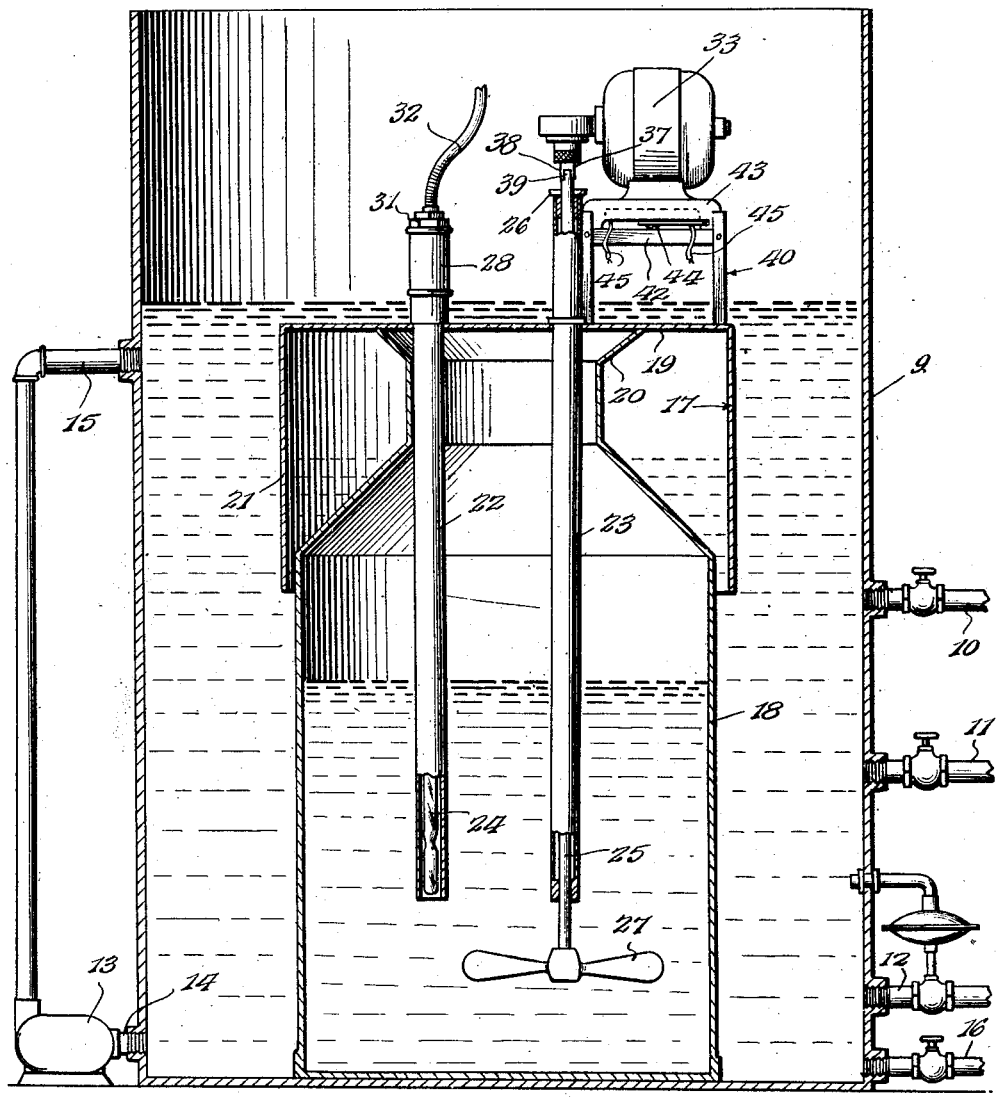

June 2, 1931.  W. R. LAIRD  1,807,742
PASTEURIZING APPARATUS
Filed March 1, 1930  2 Sheets-Sheet 2
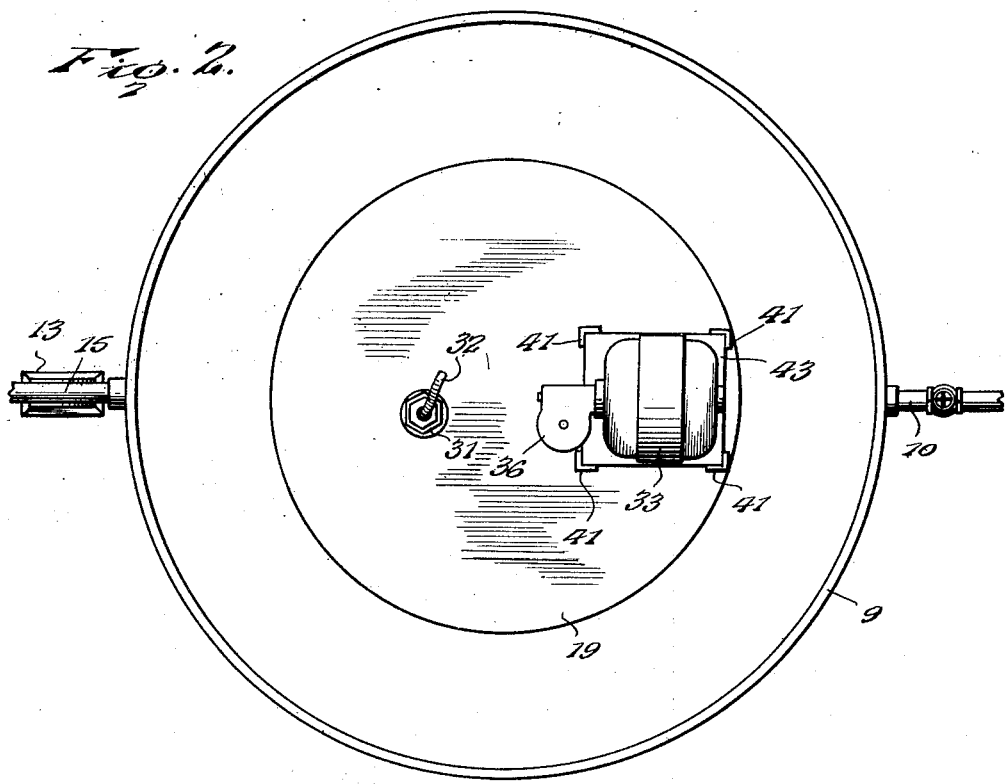
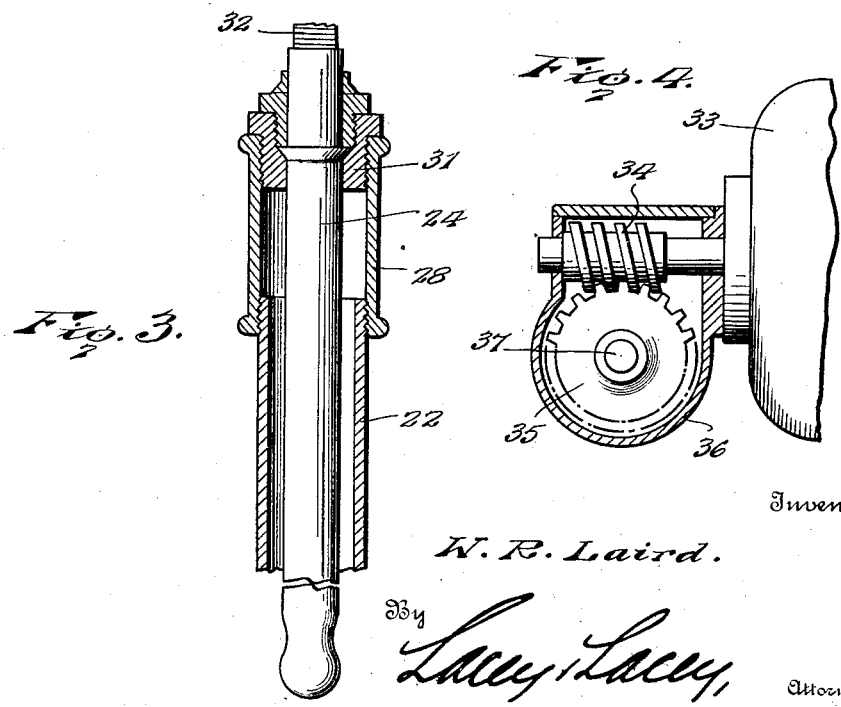

Patented June 2, 1931

1,807,742

UNITED STATES PATENT OFFICE

WILLIAM R. LAIRD, OF SIOUX FALLS, SOUTH DAKOTA, ASSIGNOR TO ALLIED LABORATORIES, INCORPORATED, OF CHICAGO, ILLINOIS, A CORPORATION OF DELAWARE

PASTEURIZING APPARATUS

Application filed March 1, 1930. Serial No. 432,574.

This invention relates to pasteurizing apparatus and has for an object to provide apparatus for pasteurizing and chilling clear serum in a stock container which container also constitutes the storage container for the product so that contamination and shrinkage is reduced to a minimum.

A further object of the invention is to provide apparatus of this type which is adapted to be entirely submerged during the pasteurizing process and permit of the process being carried out without the use of gaskets which hitherto have leaked and contaminated the product.

A still further object is to provide apparatus of this type which may be readily sterilized and will have but two hollow tubes which are integral with the hood and extend thereabove for permitting of the ready attachment of the thermometer and agitator motor which are removed during the sterilizing treatment.

A still further object is to provide apparatus of this type which will permit of a desired temperature being maintained more evenly throughout the serum during the pasteurizing process than hitherto possible.

A still further object is to provide apparatus by means of which the use of expensive containers will be eliminated, the device being applicable to ordinary ten gallon stock containers of the milk can type without alteration to any of the parts.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings, forming part of this specification,

Figure 1 is a longitudinal sectional view through pasteurizing apparatus constructed in accordance with my invention, Figure 2 is a plan view of the apparatus, Figure 3 is a fragmentary sectional view through the thermometer tube, and Figure 4 is a fragmentary sectional view showing the motor driven gearing for rotating the agitator.

Referring now to the drawings in which like characters of reference designate similar parts in the various views, 9 indicates a vat which may be formed of any desired material and is provided with a valve controlled brine pipe 10 and also with a valve controlled water supply pipe 11 and with a thermostat valve controlled live steam pipe 12. A water pump 13 is connected to the vat by means of a pipe 14, and above the pipe 14 there is an outlet pipe 15 also connected with the vat and pump whereby the pump will maintain a constant circulation of water or brine in the vat. A valve controlled drain pipe 16 is also connected with the vat for draining off the water prior to admitting the brine as will be hereinafter more fully described. The water level in the vat is maintained about an inch or more above the hood of the pasteurizing apparatus hereinafter described so that said apparatus is practically submerged throughout the process.

In the preferred embodiment of my invention a hood 17 is provided with an open bottom to receive preferably a ten gallon container 18 of the milk can type. The top 19 of the hood is preferably flat whereby it will fit snugly upon the flared mouth 20 of the container. The cylindrical side wall 21 of the hood is of such diameter as to provide an annular space between the wall of the container 18 and the hood.

The hood and container may both be constructed of aluminum, Allegheny or Monel metal, or any other desired metal which may be easily sterilized and kept in a sanitary condition.

A pair of vertically disposed tubes 22 and 23 are secured in spaced relationship on the top 19 of the hood and extend considerably above the hood and also extend downwardly in the container 18 to nearly the bottom thereof. The tube 22 which will be hereinafter referred to as the thermometer tube is open at the bottom and is also open at the top to receive a thermometer 24. The tube 23 is closed at the bottom and at the top and rotatably receives an agitator shaft 25. The shaft is held in place by means of a pin 26 which passes through the upper end of the shaft and bears against the upper end of the tube. The lower end of the shaft is equipped with agitator blades 27.

The thermometer 24 is provided at the top with a threaded fitting 31 which is screwed into the top of the coupling 28 to removably secure the thermometer in the thermometer tube 22. The thermometer is as usual connected by means of a flexible pipe 32 to a clock or gauge (not shown) for indicating the temperature.

For rotating the agitator a motor 33 is disposed above the top of the hood, the motor shaft, as shown best in Figure 4, being equipped with a worm 34 which drives a pinion 35, both the worm and pinion being housed in a suitable housing 36 which is integral with the motor. The pinion shaft 37 is equipped in the bottom with a groove 38 which receives a tongue 39 projecting from the upper end of the agitator shaft 25 as best shown in Figure 1.

The motor 33 is mounted on a frame work designated in general by the numeral 40 and comprising four angle iron legs 41 the lower ends of which are fixedly secured in any preferred manner to the top of the hood. A plate 42 connects the legs near the upper ends thereof. The motor base 43 is preferably square in outline and snugly fits the angle iron corner legs 41 of the frame and is supported on the plate 42 at such a height above the top of the hood as to permit the tongue 39 of the agitator shaft entering the groove 38 of the pinion shaft when the motor is placed on the frame 40.

The motor is provided with the usual switch 44 which permits of the motor being run at various speeds. Electrical conductors 45 connect the motor with any suitable source of current supply.

In operation, the motor 33 and thermometer 24 are removed. Then the hood is placed on the container 18 and the parts thus assembled are placed in a steam sterilizer and sterilized. The serum to be pasteurized is then placed in the container 18. The thermometer which also has been previously sterilized is then lowered into the tube 22 and secured in place by the fitting 31. The motor 33 is then mounted in place with the pinion shaft interlocking with the agitator shaft.

The apparatus assembled as above described is then lowered into the vat 9 and water is admitted through the pipe 11 until the water level preferably extends about one or two inches above the hood. As the water rises it compresses air in the serum container 18 and in the hood 17 and forms an effective water seal.

Steam is then admitted through the pipe 12 and the pump 13 started whereby the temperature of the water bath is raised and a uniform temperature maintained throughout the bath by the constant circulation produced by the pump. The motor 33 is simultaneously started and agitates the serum so that a uniform temperature throughout the serum will be effected during the pasteurizing process. After attaining a temperature of approximately 59° centigrade the temperature of the serum is automatically maintained constant for a 30 minute period by the thermostat controlled steam pipe to effect the pasteurization of the serum.

To continue the process the hot water bath in the vat is drained off through the pipe 16. Brine is now admitted through the pipe 10 and takes the place of the above described water bath. The brine is constantly circulated by the pump 13. The serum in the container is subjected to this brine bath until the temperature of the serum is reduced to approximately 12° centigrade. The serum is then preserved by the addition of the preserving solution.

This is accomplished by means of a tube which is lowered through the tube 22 after removal of the thermometer, said tube being preferably formed of rubber and being of sufficient length to extend below the lower end of the tube 22. The serum is thoroughly agitated during this step of the process.

To complete the process the brine bath is drained off through the pipe 16 and the motor 33 and thermometer 24 are removed. The hood 17 is then removed from the container and the cover (not shown) is placed on the container whereupon the container is ready to be placed in cold storage for chilling and preserving preparatory to final bottling.

It is to be understood that although the term "serum" has been used through this specification that the apparatus is suitable for treating any desired liquid such as plasma, milk or the like.

From the above description it will be seen that the pasteurizing process may be effected by my improved apparatus without the use of gaskets which ordinarily leak and dilute and contaminate the product.

It will also be observed that the pasteurization of the serum is effected in the same container in which it is to be stored without alteration to the container, and for this purpose an ordinary milk can may be used in lieu of the expensive specially constructed containers which add to the cost of the pasteurizing process as hitherto carried out.

Having thus described the invention, I claim:

1. A pasteurizing device comprising an open bottom hood adapted to form a cover for a container having a flared mouth and adapted to provide an annular space between the wall of the hood and the wall of the container, said hood and said container being adapted to be submerged whereby the hood is sealed to the container with liquid, a pair of tubes carried by the hood, a thermometer in one of the tubes, an agitator carried by the other tube, and a motor removably mounted on the hood and adapted to actuate said agitator.

2. A pasteurizing device comprising an open bottom hood having a flat top and a cylindrical wall, a pair of vertically disposed tubes fixed to the top of the hood and extending above and below the hood, one of the tubes having an open bottom, a coupling on the top of the last named tube, a thermometer removably secured in said coupling and extending downwardly through said tube, an agitator shaft passing through the other of said tubes, and equipped at the bottom with blades, and means for actuating said shaft.

3. A pasteurizing device comprising an open bottom hood, a frame secured to the top of the hood, a tube passing through the top of the hood adjacent to said frame, a motor removably mounted on said frame, an agitator shaft in said tube, a gear mechanism carried by said motor, interlocking means between said shaft and said mechanism adapted to be disconnected when said motor is raised from said frame, a second tube passing through said hood parallel with the first named tube, and a thermometer removably secured in the last named tube.

4. A pasteurizing device comprising an open bottom hood, a container receivable in the open bottom of said hood and spaced laterally from the wall of said hood, a frame on said hood formed of corner legs of angle iron, a plate connecting said legs near the tops thereof, a motor having a base slidably fitting in said corner legs, a gear case integral with the motor, a shaft projecting from the gear case, an agitator shaft carried by said hood in alignment with the first named shaft, there being a groove formed in one of said shafts receiving a tongue carried by the other shaft for removably locking said shafts together, and a thermometer removably secured in said hood.

5. A pasteurizing device comprising an open bottom hood, a milk can adapted to be covered by the hood, said hood being adapted to provide an annular space between the wall of the hood and the wall of the can, a thermometer within the hood, an agitator within the hood, a motor on the top of the hood operatively and removably connected to the agitator, and a vat in which said hood and said milk can are adapted to be lowered and submerged to produce a liquid seal between the hood and milk can.

6. A pasteurizing device comprising a hood having an open bottom, a milk can for the material to be pasteurized loosely receivable into said hood through said open bottom and having a wide mouth adapted to be closed by the top of said hood, a pair of tubes carried by the hood and extending above and below the hood, a thermometer removably secured in one of the tubes, an agitator having a shaft removably secured in the other tube, a motor removably mounted on the top of the hood and operatively connected to said shaft, and a vat for a treating bath in which said hood and said can may be submerged with the bath forming a liquid seal between the hood and the can.

In testimony whereof I affix my signature.

WILLIAM R. LAIRD. [L. S.]